United States Patent [19]

Hudson

[11] Patent Number: 4,656,893

[45] Date of Patent: Apr. 14, 1987

[54] WIRE STRIPPING TOOL

[76] Inventor: Neal W. Hudson, 232 W. Washington, Meridian, Id. 83642

[21] Appl. No.: 859,450

[22] Filed: May 5, 1986

[51] Int. Cl.⁴ ............................................. H02G 1/12
[52] U.S. Cl. ....................................... 81/9.51; 30/90.4
[58] Field of Search ...................... 30/90.4, 90.6, 90.7, 30/90.8, 91.2; 81/9.51, 9.4

[56] References Cited

U.S. PATENT DOCUMENTS

| | | | |
|---|---|---|---|
| 2,120,398 | 6/1938 | Edwards | 30/91.2 X |
| 2,385,368 | 9/1945 | Montgomery | 30/91.2 |
| 2,391,721 | 12/1945 | Lundeen | 81/9.51 |
| 2,624,221 | 1/1953 | Schneider | 30/90.4 X |
| 3,387,514 | 6/1968 | Carpenter | 81/9.51 |
| 3,462,052 | 8/1969 | Wagner | 81/9.51 X |
| 4,356,630 | 11/1982 | David | 30/90.6 X |

Primary Examiner—Jimmy C. Peters
Attorney, Agent, or Firm—Paul F. Horton

[57] ABSTRACT

A tool for cutting insulation from electrical wire including a housing; an insert receivable by the housing, said insert including a wire guide opening and a grooved shoulder approximating the size of the wire to support the wire during the cutting operation; and one or more blades adjustably and transversely mounted to the longitudinal axis of the shoulder groove for cutting the insulation from the wire as the wire is pulled through the wire guide opening and along the groove of the insert. The insert is readily removable, being locked in place during use. In this manner, inserts having varying diameters of openings and grooves approximating the diameter of the insulated wire to be stripped may be employed.

7 Claims, 4 Drawing Figures

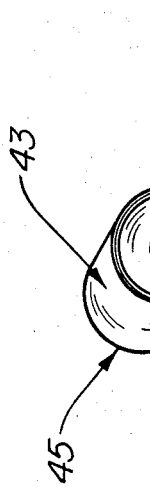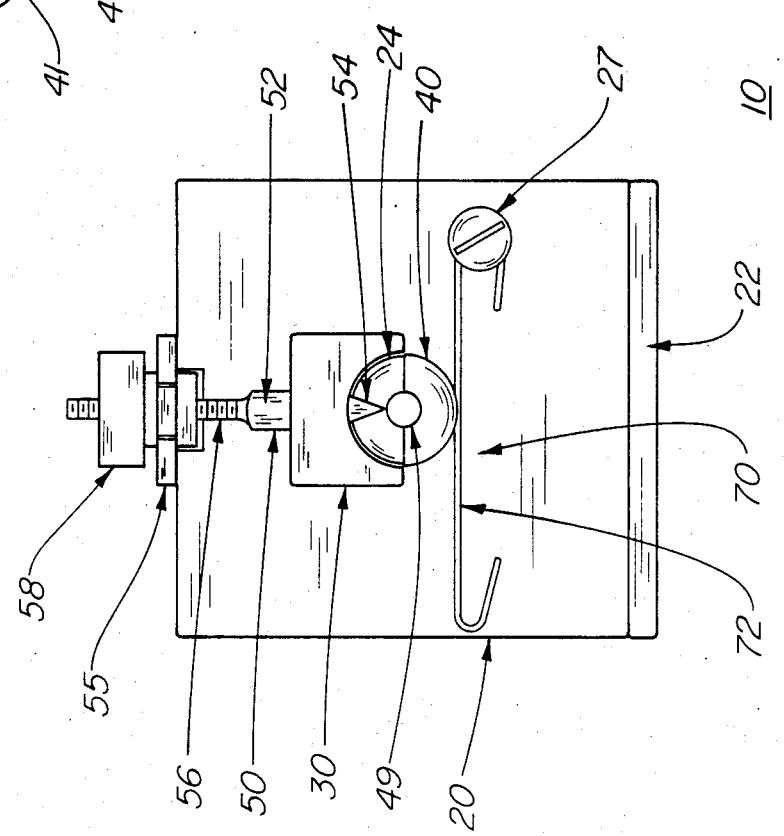

WIRE STRIPPING TOOL

BACKGROUND OF THE INVENTION

1. Field of the Invention

This invention relates, in general, to wire stripping tools and, more particularly, to tools for making longitudinal cuts in wire insulation for removal of the insulation and salvage of the wire.

2. Description of the Prior Art

The desirability of salvaging wire from old insulated wire or from insulated wire scraps is well known. The cleaner the wire salvaged, the higher the price paid for the clean metal; the metal usually being copper or aluminum.

Known in the art are the devices of Wilson, Wagner, and more recently that of David. U.S. Pat. No. 2,329,805 issued to Wilson discloses an electric cable cutter which utilizes a combination guide and guard with an adjustable blade extending into the substantially V-shaped guard. The device is used by pulling it longitudinally over the wire to sever the insulation. The single guard is used to accommodate all wire sizes. U.S. Pat. No. 3,462,052 issued to Wagner discloses a frame having two pair of oppositely mounted rotary blades adapted to engage an object placed therebetween. U.S. Pat. No. 4,356,630 issued to David is a cable slitting tool having a blade held between holder halves; the blade extending into slots of set size for slitting the casing of a cable. The primary problems with existing devices is the failure to accommodate wires of varying diameters and the failure to provide unobstructed support for guiding and supporting the wire while permitting blade adjustment relative to the thickness of the insulation. Additionally, where a cut is made within a tight enclosure, the natural expansion of the loosened insulation tends to clog the enclosure.

SUMMARY OF THE INVENTION

These problems are overcome by the present invention which provides an housing operable to receive and lock inserts. The inserts of the present invention have a preselected wire guide opening and groove for the reception of a particular wire size and for the unobstructed guidance of the wire, while permitting blade adjustment for cutting insulation at a precise and preselected depth.

It is therefore a primary object of the present invention to provide a wire stripping tool provided with one or more inserts, each insert having a preselected opening and groove approximating the size of the insulated wire to be cut.

It is another object of the present invention to provide a wire stripping tool which includes one or more inserts, each insert provided with a wire guide opening and a grooved wire support member for unobstructed and controlled cutting of wire insulation.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 2 is a front elevation of the tool shown in FIG. 1.

FIG. 3 is a perspective view of one insert of the present invention.

DETAILED DESCRIPTION OF THE INVENTION

Figure 1:
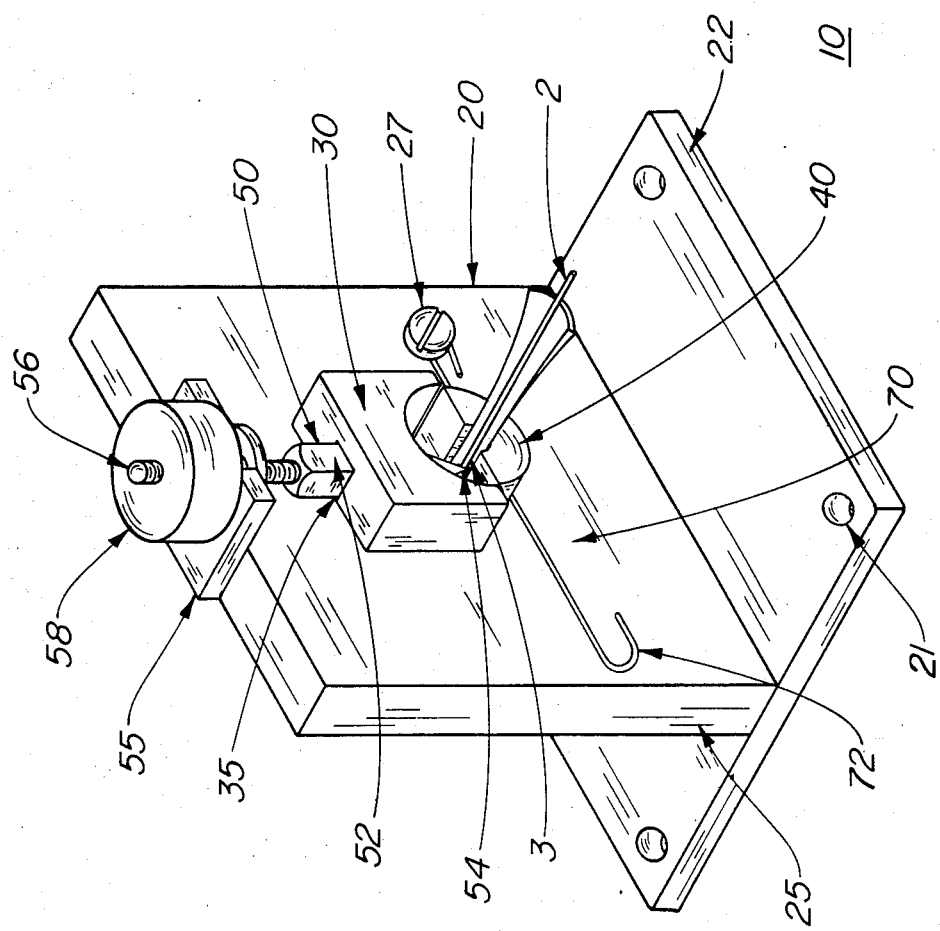
FIG. 1 is a perspective view of one preferred embodiment of the stripping tool of the present invention, shown cutting insulation from a wire.

Referring now to the drawings, and more particularly to FIG. 1, an embodiment to be preferred of a wire stripping tool 10 made according to the present invention is disclosed. Tool 10 includes a housing designated generally by the numeral 20; an insert 40; and at least one cutting blade 50.

Housing 20 preferably includes an horizontal base 22 and an upright standard 25. The base may be constructed of iron or steel and includes bolt holes 21 adjacent each corner for attachment to any existing support structure, if desired. Standard 25 also is preferably constructed of iron or steel and is welded or otherwise affixed to the base, near the longitudinal center of the base, and extends transversely vertical to the base.

Standard 25 defines an opening 24, as may be seen in FIG. 2, for receiving insert 40. Mounted on the standard, just above the opening, as by welding, is a blade sleeve member 30. Sleeve member 30 includes a single, vertically oriented sleeve or slot 35 for reciprocal retainment of blade 50. Mounted outwardly in alignment with sleeve member 30 is slotted flange 55 for reception of rotary nut 58 for adjustment of the blade, as will hereinafter be explained. Flange 55 extends horizontally in front of the standard, parallel with the base, with the slot of the flange being in alignment with the blade.

Blade 50 includes a polished body portion 52 for sliding engagement with sleeve member 30, terminating at its lowermost end in a beveled knife portion 54, and a threaded shaft portion 56 which threadingly engages rotary nut 58. Nut 58 is provided with an annular groove for rotatingly engaging flange 55 to hold the nut in place. It will be seen, then, that rotation of nut 58 causes the blade to move up and down through sleeve member 30 for controlling the depth of cut on wire insulation.

Insert 40, shown to advantage in FIG. 3, includes a body portion 45 and a shoulder portion 48. Body portion 45 is preferably circular in cross-section, having a diameter slightly less than the diameter of housing opening 24 so that the wall 43 of the insert snugly engages the wall of the opening and having a diameter slightly larger than the semicircular opening of sleeve member 30 to securely engage the sleeve member to prevent forward movement of the insert relative to the sleeve member. Shoulder 48 is semicircular in cross-section, having an outside diameter equal to that of the body portion. The insert is provided with an aperture which is bored or otherwise formed through the longitudinal axis of the body portion and the shoulder portion to form a circular wire guide opening 49 in the body portion and a semicircular groove 47 in the shoulder portion; the diameter of opening 49 and groove 47 being equal. Various inserts are provided with varying sizes of openings and grooves to accommodate insulated wires of a particular diameter.

Lock means, designated generally by the numeral 70, is used to hold insert 40 firmly in contact with housing 20. Lock means 70, in the preferred embodiment, includes a cantilever 72, which may be constructed of spring metal, and an insert having a groove about the periphery of the shoulder adjacent the junction of shoulder and body portion. Cantilever 72 is attached to standard 25, as by a machine screw 27, and is spring biased to engage the groove of the insert to prevent slippage.

Figure 4:
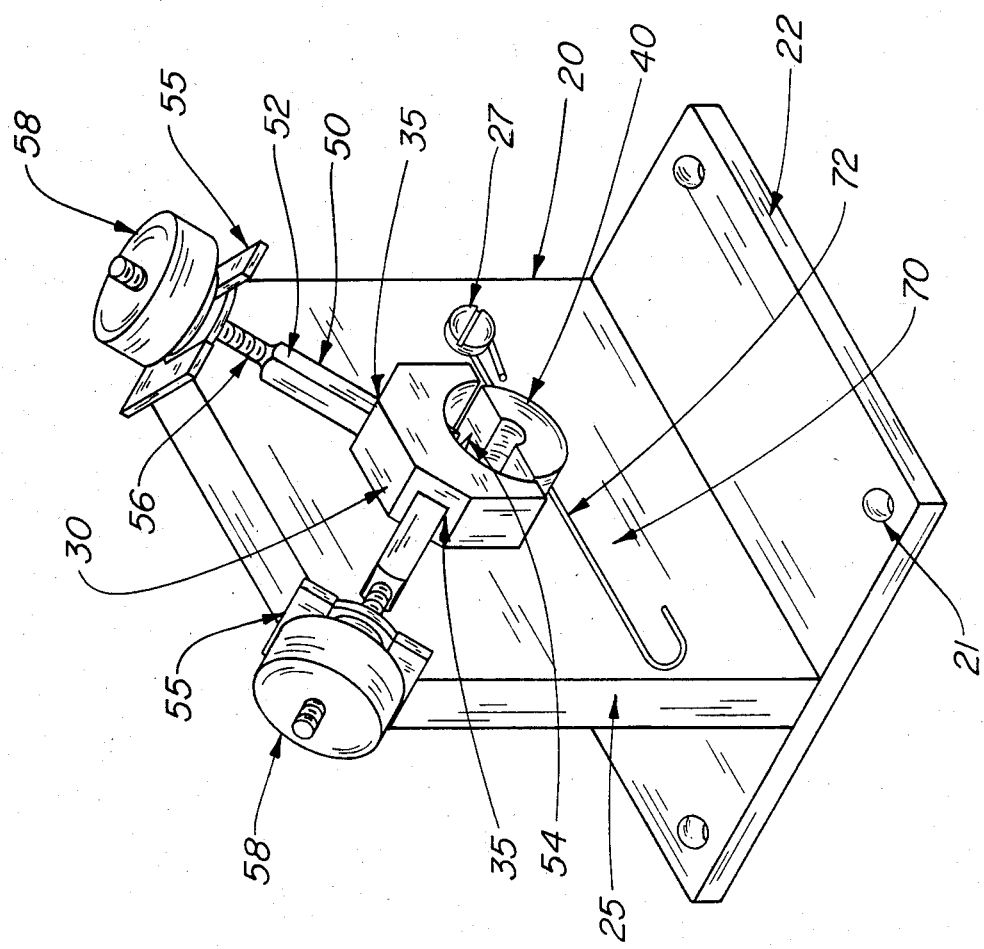
FIG. 4 is a perspective view of a second embodiment of the stripping tool of the present invention showing the use of two blades.

Referring now to FIG. 4, a second embodiment of the tool is shown. This embodiment is identical to the embodiment of FIG. 1, except the second embodiment includes two blades 50, individually adjustable by separate rotary nuts 58, the blades beings set at right angles to one another and forty five degrees from vertical. Sleeve member 30 is therefor provided with two slots or sleeves 35 and two slotted flanges 55 for receiving each of the rotary nuts 58.

In operation, and now referring to FIG. 1, an insert 40 having a wire guide opening 49 and groove 47 which approximate the diameter of insulated wire 3 is mounted in place by slipping the insert into opening 24 of standard 25 with the walls 43 of the insert engaging the interior walls of the opening. Cantilever 72 is forced downwardly during the insertion and then springs upwardly, in being so biased, to engage groove 41 of the insert to hold the insert firmly in place. Insulated wire 3 is then drawn through opening 49 of the insert and blade 50 lowered by means of rotation of rotary nut 58 until knife 54 of the blade cuts into the insulation to a desired depth in proximity to wire 2. It will be noted that knife 54 engages insulated wire 3 immediately exterior of opening 49 to force insulated wire 3 into contact with the smooth groove 47 of the insert. In this manner, the lower half of insulated wire 3 is completely supported, both vertically and laterally, by its contact with the one hundred eighty degree groove. It is also to be noted that the cut by blade or blades 50 are on the top surface of the wire; the top surface being completely unobstructed except for the blade or blades, themselves, to permit unimpaired expansion of the insulation, as it separates from the wire, and to permit unobstructed removal of the insulation as the wire is pulled from back to front though the insert.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A wire stripper for cutting insulation from a wire, said cutter comprising:
   a stationary housing defining an opening for receiving and holding an insert;
   a wire guide insert received by the opening of said housing, said insert including a body portion and a shoulder portion, said body portion provided with a wire guide opening and having an exterior wall engageable with the interior wall of the opening of said housing and said shoulder portion including a longitudinally extending groove of equal size and concentric with the opening of said body portion for supporting an insulated wire placed therein; and
   at least one cutting blade mounted on said housing, each of said blades transversely mounted relative to the groove of said shoulder portion of said insert and each blade adjustably and reciprocally movable to and from the longitudinal axis of the groove for cutting insulation from wire drawn through the wire guide opening of said body portion and groove of said insert.

2. The apparatus as described in claim 1 wherein said housing includes a horizontal base member and a vertically extending standard affixed thereto, said standard defining the opening for reception of said insert.

3. The apparatus as described in claim 1 wherein said wire guide opening and wire guide groove of said insert are circular and semicircular in cross-section, respectively.

4. The apparatus as described in claim 1 further comprising insert lock means for securing said insert to said housing.

5. The apparatus as described in claim 4 wherein said lock means includes an annular groove about the periphery of said shoulder portion and a cantilever mounted on said housing, said cantilever operable to engage said annular groove.

6. The apparatus as described in claim 5 wherein said cantilever is spring biased.

7. The apparatus as described in claim 1 wherein each of said blades include a body portion terminating in a knife and a threaded shaft portion, said body portion slidably engaging a sleeve member affixed to said housing and said threaded shaft portion engaging a threaded nut rotatably mounted on said housing whereby rotation of the nut moves said blade a selected distance relative to said wire guide groove of the shoulder portion of said insert.

* * * * *